United States Patent [19]

Lutz

[11] 4,293,161
[45] Oct. 6, 1981

[54] VEHICLE ROOF

[75] Inventor: Alfons Lutz, Emmering, Fed. Rep. of Germany

[73] Assignee: Webasto-Werk W. Baier GmbH & Co., Munich, Fed. Rep. of Germany

[21] Appl. No.: 103,713

[22] Filed: Dec. 14, 1979

[30] Foreign Application Priority Data

Dec. 23, 1978 [DE] Fed. Rep. of Germany ....... 2856015

[51] Int. Cl.³ .............................................. B60J 7/10
[52] U.S. Cl. .................................. 296/213; 296/214; 296/216; 296/223
[58] Field of Search ............... 296/213, 214, 220, 221, 296/222, 223, 216

[56] References Cited

U.S. PATENT DOCUMENTS 3,964,784 6/1976 Prechter .............................. 296/220
4,043,590 8/1977 Pizzuti ................................. 296/222

Primary Examiner—Joseph F. Peters, Jr.
Assistant Examiner—John A. Carroll
Attorney, Agent, or Firm—Craig and Antonelli

[57] ABSTRACT

A vehicle roof having an aperture surrounded by a frame and a sliding top displaceable by drive cables and guided by means of sliding blocks in the frame as well as provided with a headliner covering the vehicle roof on an interior side thereof. In accordance with a preferred embodiment, the frame is formed with a synthetic resin and comprises sliding surfaces for the sliding blocks as well as guide ducts for the drive cables. Additionally, the preferred embodiments utilize an underside of the frame which faces the interior of the vehicle as at least part of the headliner.

19 Claims, 3 Drawing Figures

VEHICLE ROOF

BACKGROUND AND SUMMARY OF THE INVENTION

The invention relates to a vehicle body member, such as a roof, which has an aperture therein, a sliding closure panel therefor which is displaceable in a frame upon sliding blocks by drive cables, the body member being covered toward the vehicle interior by a cover panel.

In the conventional vehicle roofs of this type (for example DAS [German Published Application] No. 1,157,495) the frame is a sheet-metal part spot-welded to the vehicle roof and covered with respect to the interior space of the vehicle by a headliner which, in most cases, consists of a fabric and is glued to the edges of the frame; this headliner extends across the entire vehicle roof. The production of such a sheet-metal frame is relatively expensive, since it must be manufactured in most cases of several parts, and the guide means for the sliding blocks and for the drive cables require considerable molding work. Since this frame simultaneously forms a gutter, the connection of the parts must be tight. Besides, the frame must be very carefully enameled in order to prevent rusting. The attachment of the headliner to the frame by gluing is expensive in labor and interferes with the assembly line production if the sliding roof is to be installed in series construction.

The invention is based on the problem of providing a vehicle roof which can be manufactured and installed with less complications and thus be less costly.

This problem has been solved according to a preferred embodiment, through the use of a synthetic resin frame; the side which faces the interior of the vehicle forms at least part of the headliner.

In a vehicle roof of this invention, a frame with a guide arrangement for the sliding blocks and the drive cables can be manufactured in one working step without requiring a secondary working step or aftertreatment, for example by enameling, since the synthetic resin, if desired, can also be dyed in any color. It is unnecessary to provide a covering of the frame with respect to the interior of the vehicle, since the frame, due to its coloring and/or surface structure, acts as a headliner or part thereof. Since synthetic resin is substantially more flexible than sheet metal, the danger of injuries in collisions is considerably reduced by the arrangement of this invention. Danger of injuries can be additionally diminished by using a foamed synthetic resin at least on the surface area of the frame facing the passenger compartment.

In a preferred embodiment of the invention, the underside of the frame extends to the outer limiting edges of the roof so that the frame constitutes the entire headliner. Alternatively, the zone of the headliner lying outside of the frame can be formed by parts consisting preferably of a synthetic resin and being inserted between the outer edges of the frame and the outer limiting edges of the roof.

Especially if the sliding top consists of a transparent or translucent material, a sliding headliner is provided, which is displaceable independently of the top, in order to be able to regulate as desired the entrance of light when the sliding top is closed. Appropriate sliding and mounting surfaces must be provided for this sliding headliner; in case of the customary sheet-metal frame, these surfaces are formed by inherent elements. In the frame according to this invention, made of a synthetic resin, such sliding and mounting surfaces for the sliding headliner can be readily molded to the frame without requiring additional working steps.

The frame is attached to the vehicle roof preferably by screwing or riveting the frame to an interior roof panel provided in the usual way, this panel serving as a roof reinforcement and surrounding the roof aperture.

Since the frame customarily defines a gutter, it is advantageous to reduce the sealing problems between the frame and the vehicle roof to locate the mounting points so that they lie outside of the zone of the gutter, which latter may carry water. For this purpose, the mounting points can be arranged at a correspondingly high level above the bottom of the gutter. In this connection, the frame can have a vertical wall extending in parallel to the front edge and to the lateral edges of the roof aperture, this wall being attached to a vertical rim of the interior roof panel. Alternatively, the frame can have a horizontal rim extending toward the outside along the front edge and the lateral edges, this rim being attached to a horizontal rim extending toward the outside along the front edge and the lateral edges, this rim being attached to a horizontal rim of the interior roof panel. Optionally, a sealing means can be inserted between the contact surfaces of the frame and the interior roof panel. In another embodiment of the invention, the frame has a vertical wall extending in parallel to the front edge and to the lateral edges of the roof aperture; this wall cooperates in a leakproof way with the underside of the roof, the frame being attached by screws from below to the interior roof panel surrounding the roof aperture, outside of the vertical wall.

To form the guide ducts for the drive cables, the frame can exhibit ribs extending in parallel to its front edge and its two lateral edges, these ribs forming between them the guide ducts and being covered toward the top at least partially by a cover. The guide means for the sliding blocks can be constructed in the same way. The mounting of these covers by means of screws is considerably more secure in the arrangement of this invention than in a frame made of sheet metal, since, in the latter, due to the thin wall thickness of the sheet metal, there is always the danger of a stripping of the mounting screw holes.

The frame can be made of a large number of various synthetic resins. The use of glass-fiber-reinforced polyester proved to be especially advantageous.

These and other objects, features and advantages of the present invention will become more apparent from the following description when taken in connection with the accompanying drawings, which show, for purposes of illustration only, plural embodiments in accordance with the present invention.

DETAILED DESCRIPTION OF THE PREFERRED EMBODIMENTS

Figure 1:
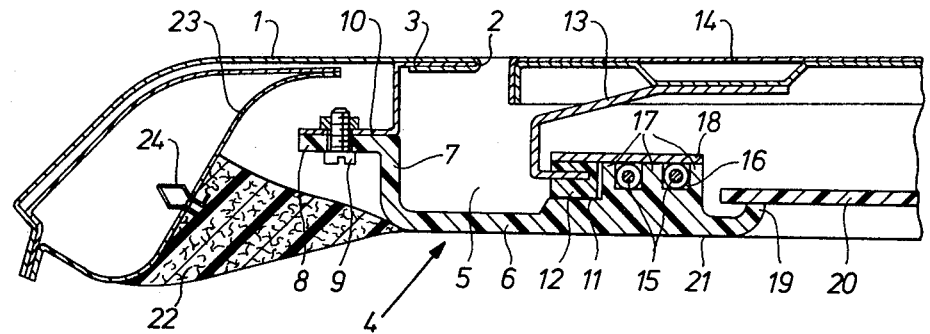
FIG. 1 is a sectional view of a vehicle roof wherein the section plane is taken at right angles to a lateral edge of the roof aperture, according to a first embodiment of the invention.

FIG. 1 shows a section through a vehicle roof comprising an outer skin 1 wherein a rectangular roof aperture 2 is provided. To reinforce the outer skin 1, an inner panel 3 is arranged in the zone of the roof aperture 2; this panel is connected to the outer skin 1 by flanging over the rim of the outer skin in the zone of the roof aperture 2. The roof aperture 2 is surrounded by a one-piece frame of a synthetic resin, generally denoted by 4, defining a gutter 5 in the region of the front edge and the lateral edges of the roof aperture 2 and comprising for this purpose an essentially horizontal wall portion 6 and an essentially vertical wall portion 7. At the end of the vertical wall portion 7, the frame 4 is provided with an outwardly extending rim 8 attached by screws 9 from below to a horizontal rim 10 of the interior roof panel 3. The frame 4 consists of a synthetic resin and has a sliding surface 11 for a sliding block 12, which latter is fastened by means of a sliding block carrier 13 to a sliding top 14. The latter closes the aperture 2 in its closed position and can be pushed rearwards underneath the outer roof panel 1 to uncover the roof aperture. Pressure-resistant drive cables 15 serve for displacing the top 14, these cables being guided in guide ducts 16 within the frame 4. These guide ducts 16 are constituted by ribs 17 extending in parallel to the front edge and to the lateral edges of the frame 4 and being closed toward the top at least in part by a cover 18. The cover 18 also extends over the guide surface 11 for the sliding block 12 in the zone of the lateral edges of the frame, so that a guide duct is formed for the sliding block 12. The cover 18 is screwed to the frame 4 by means of screws, not shown. The rib 17 disposed farthest to the left in FIG. 1 constitutes a limitation for the guide duct receiving the sliding block 12 and is simultaneously a boundary for the water trough 5. The inner rim 19 of the frame 4 forms a contact surface for an optionally displaceable headliner 20 covering the sliding top 14 toward the inside.

The inner surface 21 of the frame 4 forms, in the embodiment of FIG. 1, a part of the headliner covering the vehicle roof toward the interior. The space between the rims of the frame 4 and the outer boundary edges of the roof is covered in this embodiment by synthetic resin parts 22 joined on the one hand, to a part 23 of the interior roof panel by means of clips 24 and contacting the frame 4, on the other hand.

The junction point between the frame 4 and the interior roof panel 3 is located, as can be seen, considerably above the bottom 6 of the gutter 5 so that there is no danger of water entering the vehicle interior from the gutter 5. Additionally, a flat sealing means can be inserted between the contact surfaces of the rims 8 and 10.

Figure 2:
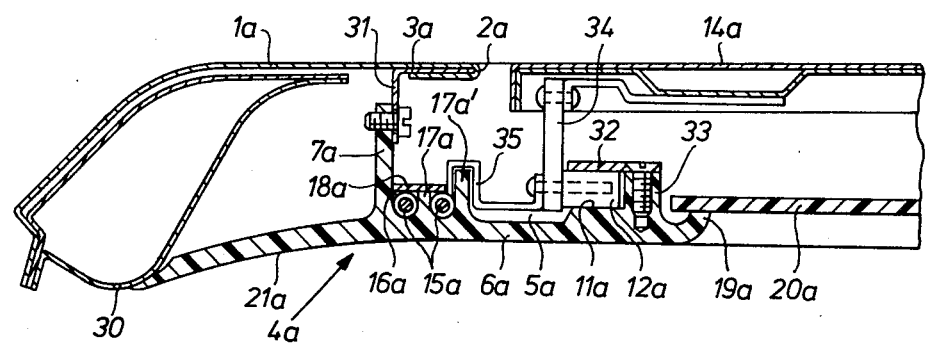
FIG. 2 shows a sectional view corresponding to FIG. 1 illustrating a second embodiment of the invention.

In the embodiment according to FIG. 2, wherein identical or similar components as in the embodiment of FIG. 1 bear the same reference numerals, but with the added index "a", the frame 4a extends up to the outer boundary edges 30 of the roof so that it constitutes the entire headliner, and the headliner parts 22 of FIG. 1 can be omitted. In this embodiment, the frame 4a is screwed with its vertical wall 7a directly to a vertical section 31 of the interior roof panel 3a. This screw connection is again considerably above the bottom 6a of the gutter 5a so that water from the gutter 5a cannot enter the interior space of the vehicle. In this embodiment, the cable guide ducts 16a are arranged in close proximity to the vertical wall 7a. To protect these guide ducts 16a from the entrance of rain water to a maximum extent, the rib 17a' is fashioned to be so high that it practically forms the boundary for the gutter 5a laterally toward the outside. The guide ducts 16a are partially covered toward the top by a cover 18a as in the embodiment of FIG. 1. In a modification of the embodiment of FIG. 1, a separate cover 32 is provided for covering the guide duct for the sliding block 12a; this separate cover is screwed to an upwardly projecting rib 33 of the frame 4a. The sectional view shown in FIG. 2 is taken through the rearward sliding block 12a of the top 14a, so that the device 34 required for lowering the rearward edge of the top 14a becomes visible; this device 34 is shown only in principle. FIG. 2 likewise illustrates the connection between a drive cable 15a and the sliding block 12a by means of an entrainment member 35 extending through a gap between the rib 17a' and the cover 18a.

Figure 3:
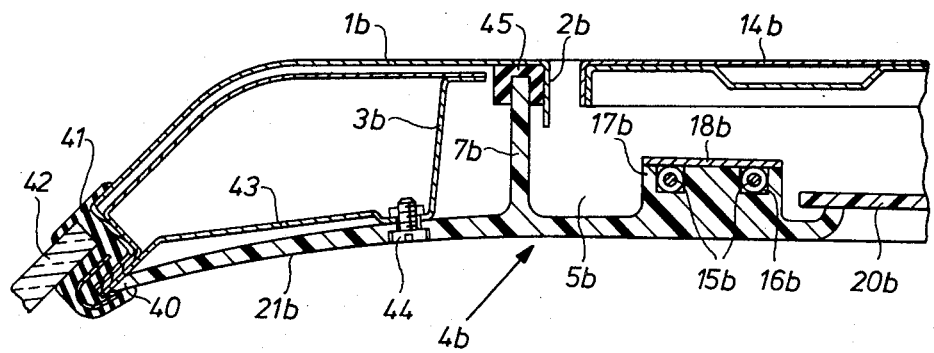
FIG. 3 is a sectional view of a vehicle roof wherein the section plane is taken at right angles to the front edge of the roof aperture.

In FIG. 3, identical or similar parts as in FIG. 1 are denoted by the same reference numerals, but with the index "b". In this embodiment, the frame 4b, as in the embodiment of FIG. 2 extends up to the outer boundary edges of the roof. The forward edge 40 of the frame is overlapped by the sealing profile 41 of the windshield 42. The frame 4b is attached to a substantially horizontally extending part 43 of the interior roof panel 3b by means of screws 44.

In this embodiment, the wall 7b is raised into close proximity with the outer roof panel 1b, and the rim of this wall is in contact with the outer roof panel 1b by way of a sealing member 45. Since the section of FIG. 3 is taken through the front edge of the roof aperture, guide means for sliding blocks are not visible. In the zone of the lateral edges of the roof aperture, a guide means for the sliding blocks can be provided in the way illustrated in FIGS. 1 or 2.

What is claimed is:

1. Vehicle roof with an aperture surrounded by a frame, a sliding top displaceable by drive cables being guided by means of sliding blocks in said frame, and with a headliner covering the vehicle roof on an interior side thereof, characterized in that the frame is formed of synthetic resin and comprises, on the one hand, sliding surfaces for the sliding blocks and, on the other hand, guide ducts for the drive cables; and that an underside of the frame facing the interior of the vehicle constitutes at least in part the headliner, wherein portions of the frame constituting said headliner, at least in part, are unitarily formed with parts of said frame comprising said sliding surfaces and guiding ducts.

2. Vehicle roof according to claim 1, wherein an independently displaceable sliding headliner is provided covering the sliding top on a bottom side thereof, and characterized in that the frame comprises sliding and mounting surfaces for the sliding headliner.

3. Vehicle roof according to claims 1 or 2, characterized in that the frame has ribs extending in parallel to a front edge thereof and two lateral edges thereof, said ribs forming between them the guide ducts for the drive cables and being at least partially closed toward the top by means of a cover.

4. Vehicle roof according to one of claims 1 or 2, characterized in that the frame comprises a horizontal rim extending toward the outside along front and lateral edges, this rim being attached to a horizontal rim of an interior roof panel surrounding the roof aperture.

5. Vehicle roof according to claim 3, characterized in that the frame comprises a horizontal rim extending toward the outside along front and lateral edges, this rim being attached to a horizontal rim of an interior roof panel surrounding the roof aperture.

6. Vehicle roof according to one of claims 1 or 2, characterized in that the frame comprises a vertical wall extending in parallel to front and lateral edges of the roof aperture, said wall being attached to a vertical rim of an interior roof panel surrounding the roof aperture.

7. Vehicle roof according to claim 3, characterized in that the frame comprises a vertical wall extending in parallel to front and lateral edges of the roof aperture, said wall being attached to a vertical rim of an interior roof panel surrounding the roof aperture.

8. Vertical roof according to one of claims 1 or 2, characterized in that the frame comprises a vertical wall extending in parallel to front and lateral edges of the roof aperture, said wall cooperating in the manner of a seal with the underside of the roof; and that the frame is screwed from below to an interior roof panel surrounding the roof aperture, outside of the vertical wall.

9. Vehicle roof according to claim 3, characterized in that the frame comprises a vertical wall extending in parallel to front and lateral edges of the roof aperture, said wall cooperating in the manner of a seal with the underside of the roof; and that the frame is screwed from below to an interior roof panel surrounding the roof aperture, outside of the vertical wall.

10. Vehicle roof according to claim 1, characterized in that the sliding surfaces for the sliding blocks are bounded on one side by raised ribs and form, together with a cover, guide ducts for the sliding blocks.

11. Vehicle roof according to claim 3, characterized in that the sliding surfaces for the sliding blocks are bounded on one side by raised ribs and form, together with a cover, guide ducts for the sliding blocks.

12. Vehicle roof according to claims 1 or 2, characterized in that the underside of the frame extends up to inner boundary edges of the roof that are displaced outwardly relative to said aperture.

13. Vehicle roof according to claim 1 or 2, characterized in that the frame consists of glass-fiber-reinforced polyester.

14. Vehicle roof according to claim 3, characterized in that the frame consists of glass-fiber-reinforced polyester.

15. Vehicle roof according to claim 1, wherein portions of said frame constituting said headliner extend to outer limiting edge areas of the roof so as to constitute the entire headliner.

16. Vehicle roof according to claim 15, wherein portions of said frame constituting said headliner comprise flange-like extensions projecting horizontally from portions of said frame comprising said sliding surfaces and guide ducts.

17. Vehicle roof according to one of claim 15 wherein portions of said frame constituting said headliner comprise flange-like extensions projecting horizontally from portions of said frame comprising said sliding surfaces and guide ducts.

18. Vehicle roof with an aperture surrounded by a frame, a sliding top displaceable by drive cables being guided by means of sliding blocks in said frame, and with a headliner covering the vehicle roof on an interior side thereof, characterized in that the frame is formed of synthetic resin and comprises, on the one hand, sliding surfaces for the sliding blocks and, on the other hand, guide ducts for the drive cables; and that an underside of the frame facing the interior of the vehicle constitutes at least in part the headliner, wherein portions of said frame constituting said headliner extend to outer limiting edge areas of the roof so as to constitute the entire headliner.

19. Vehicle roof with an aperture surrounded by a frame, a sliding top displaceable by drive cables being guided by means of sliding blocks in said frame, and with a headliner covering the vehicle roof on an interior side thereof, characterized in that the frame is formed of synthetic resin and comprises, on the one hand, sliding surfaces for the sliding blocks, and, on the other hand, guide ducts for the drive cables; and that an underside of the frame facing the interior of the vehicle constitutes at least in part the headliner, wherein portions of said frame constituting said headliner comprise flange-like extensions projecting horizontally from portions of said frame comprising said sliding surfaces and guide ducts.

* * * * *